(12) United States Patent
Kouyanagi (10) Patent No.: US 9,184,696 B2
(45) Date of Patent: Nov. 10, 2015

(54) SOLAR CELL MODULE AND METHOD FOR MANUFACTURING THE SAME

(75) Inventor: Masao Kouyanagi, Izumiotsu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 246 days.

(21) Appl. No.: 13/392,166

(22) PCT Filed: Aug. 23, 2010

(86) PCT No.: PCT/JP2010/064172
§ 371 (c)(1),
(2), (4) Date: Feb. 24, 2012

(87) PCT Pub. No.: WO2011/024752
PCT Pub. Date: Mar. 3, 2011

(65) Prior Publication Data
US 2012/0145242 A1  Jun. 14, 2012

(30) Foreign Application Priority Data
Aug. 25, 2009 (JP) .................................. 2009-193928

(51) Int. Cl.
*H01L 31/042* (2014.01)
*H02S 40/34* (2014.01)
*H02G 3/10* (2006.01)
*H02G 3/08* (2006.01)
*H02G 3/16* (2006.01)

(52) U.S. Cl.
CPC ................ *H02S 40/34* (2014.12); *H02G 3/088* (2013.01); *H02G 3/105* (2013.01); *H02G 3/16* (2013.01)

(58) Field of Classification Search
CPC ................ H01L 31/0485; H02S 40/34; H02G 3/08–3/105
USPC ........................................................ 136/244
See application file for complete search history.

(56) References Cited

U.S. PATENT DOCUMENTS

| | | | |
|---|---|---|---|
| 5,268,038 A * | 12/1993 | Riermeier et al. | 136/251 |
| 5,513,075 A * | 4/1996 | Capper et al. | 361/773 |
| 6,207,896 B1 | 3/2001 | Toyomura | |
| 6,462,265 B1 | 10/2002 | Sasaoka et al. | |
| 2001/0001424 A1 * | 5/2001 | Sasaoka | 174/50 |

FOREIGN PATENT DOCUMENTS

| | | |
|---|---|---|
| JP | 09-055528 A | 2/1997 |
| JP | 09-129909 A | 5/1997 |
| JP | 10-331815 A | 12/1998 |
| JP | 2001-250965 A | 9/2001 |

(Continued)

*Primary Examiner* — Allison Bourke
(74) *Attorney, Agent, or Firm* — Marvin A. Motsenbocker; Mots Law, PLLC (57) ABSTRACT

Disclosed is a solar cell module wherein deterioration of the strength of adhering between a solar cell panel and a terminal box can be suppressed, while reducing the quantity of an adhesive to be used. The solar cell module (1) is provided with the terminal box (3) which is adhered to the solar cell panel (2) with the adhesive (4) therebetween. The adhesive surface (31*a*) of the terminal box, said adhesive surface having the solar cell panel (2) adhered thereon, includes a top portion (31*f*) where the distance to the surface of the solar cell panel (2) is shortest, and an inclined portion (31*g*) which is configured such that the distance to the surface of the solar cell panel increases toward the side far from the top portion.

10 Claims, 8 Drawing Sheets

(56) References Cited

FOREIGN PATENT DOCUMENTS

| JP | 2005-019843 A | 1/2005 |
| JP | 2006-005255 A | 1/2006 |
| JP | 2006-148176 A | 6/2006 |
| JP | 2006-278904 A | 10/2006 |
| JP | 2007-311665 A | 11/2007 |

* cited by examiner

SOLAR CELL MODULE AND METHOD FOR MANUFACTURING THE SAME

TECHNICAL FIELD

The present invention relates to a solar cell module and a method for manufacturing the same, and more particularly, it relates to a solar cell module including a solar cell panel and a terminal box and a method for manufacturing the same.

BACKGROUND TECHNIQUE

A solar cell module including a solar cell panel and a terminal box is known in general. Such a solar cell module is disclosed in Japanese Patent Laying-Open No. 9-129909, for example.

The aforementioned Japanese Patent Laying-Open No. 9-129909 discloses a structure in which a terminal box is adhered to the surface of a solar cell panel with an adhesive (silicone resin, epoxy resin or the like). In the aforementioned Japanese Patent Laying-Open No. 9-129909, the terminal box is adhered to the solar cell panel by pressing the terminal box against the surface of the solar cell panel in a state applying a pasty adhesive to the back surface (adhesive surface) thereof and hardening the adhesive.

PRIOR ART

Patent Document

Patent Document 1: Japanese Patent Laying-Open No. 9-129909

SUMMARY OF THE INVENTION

Problems to be Solved by the Invention

In the aforementioned Japanese Patent Laying-Open No. 9-129909, however, a human being performs the operation of pressing the terminal box against the solar cell panel, and hence it is difficult to press the same without inclining the adhesive surface of the terminal box with respect to the surface of the solar cell panel. In a case of pressing the terminal box in a state where the adhesive surface of the terminal box inclines with respect to the surface of the solar cell panel, pressure between the terminal box and the solar cell panel is so biased that the adhesive does not uniformly spread over the adhesive surface. In this case, uneven application of the adhesive takes place, and hence there is such a problem that adhesive strength between the terminal box and the solar cell panel lowers. In a case of increasing the quantity of the adhesive applied to the adhesive surface of the terminal box, it is possible to suppress occurrence of uneven application of the adhesive, while there is such a problem that the quantity of use of the adhesive increases.

The present invention has been proposed in order to solve the aforementioned problems, and an object of the present invention is to provide a solar cell module capable of suppressing reduction of adhesive strength between a solar cell panel and a terminal box while reducing the quantity of use of an adhesive and a method for manufacturing the same.

Means for Solving the Problems

In order to attain the aforementioned object, a solar cell module according to a first aspect of the present invention includes a solar cell panel including a solar cell and a terminal box adhered to the solar cell panel through an adhesive, for collecting electricity generated in the solar cell panel, while an adhesive surface of the terminal box adhered to the solar cell panel includes a top portion where the distance from the surface of the solar cell panel is the smallest and an inclined portion so formed that the distance from the surface of the solar cell panel enlarges as separating from the top portion.

A method for manufacturing a solar cell module according to a second aspect of the present invention includes the steps of preparing a solar cell panel including a solar cell, preparing a terminal box provided with an adhesive surface, adhered to the solar cell panel, including a top portion where the distance from the surface of the solar cell panel is the smallest and an inclined portion so formed that the distance from the surface of the solar cell panel enlarges as separating from the top portion in a state opposed to the solar cell panel, applying an adhesive to the top portion of the adhesive surface, and adhering the terminal box and the solar cell panel to each other by pressing the adhesive surface of the terminal box coated with the adhesive against the surface of the solar cell panel.

Effect of the Invention

According to the present invention, reduction in adhesive strength between a solar cell panel and a terminal box can be suppressed while reducing the quantity of use of an adhesive.

MODES FOR CARRYING OUT THE INVENTION

Embodiments of the present invention are now described with reference to the drawings.

First Embodiment

First, the structure of a solar cell module 1 according to a first embodiment of the present invention is described with reference to FIGS. 1 to 9.

Figure 1:
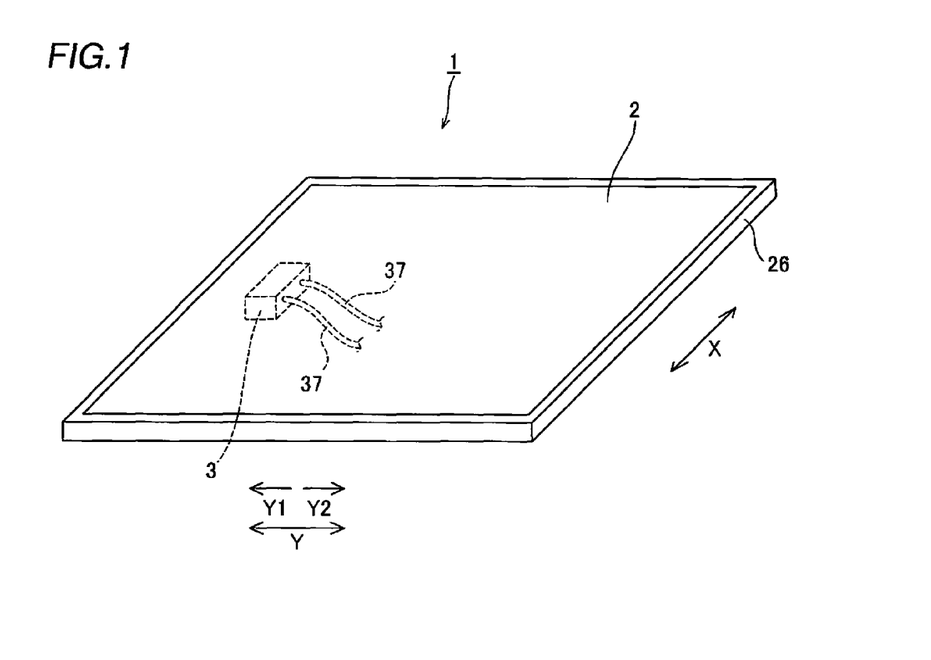
FIG. 1 A perspective view showing the overall structure of a solar cell module according to a first embodiment of the present invention.
Figure 4:
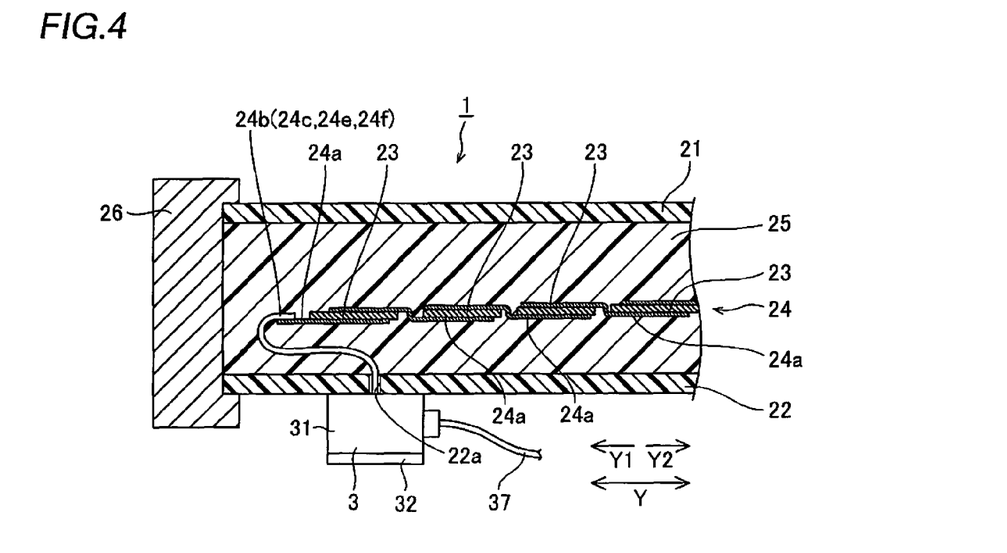
FIG. 4 A schematic sectional view of the solar cell module according to the first embodiment shown in FIG. 1.

As shown in FIG. 1, the solar cell module 1 according to the first embodiment includes a plate-type solar cell panel 2 and a terminal box 3 fixed to the side of the back surface (surface opposite to a photoreceiving surface) of the solar cell panel 2. The solar cell panel 2 is constituted of a surface-side cover 21 consisting of a transparent member of clear tempered glass or the like, a weather-resistant back-side cover 22 consisting of a resin film of polyethylene terephthalate (PET) or the like, solar cell groups 24, arranged between the surface-side cover 21 and the back-side cover 22, each consisting of a plurality of solar cells 23 electrically connected in series with each other, a bonding material 25 provided between the surface-side cover 21 (back-side cover 22) and the solar cells 23 and a metal frame body 26 made of aluminum or the like, as shown in FIG. 4. The terminal box 3 is provided for collecting electricity generated in the solar cells 23 (solar cell groups 24) of the solar cell panel 2. The terminal box 3 is adhered onto the surface of the back-side cover 22 of the solar cell panel 2 through an adhesive 4 (see FIGS. 7 and 8) to be fixed thereto.

Figure 2:
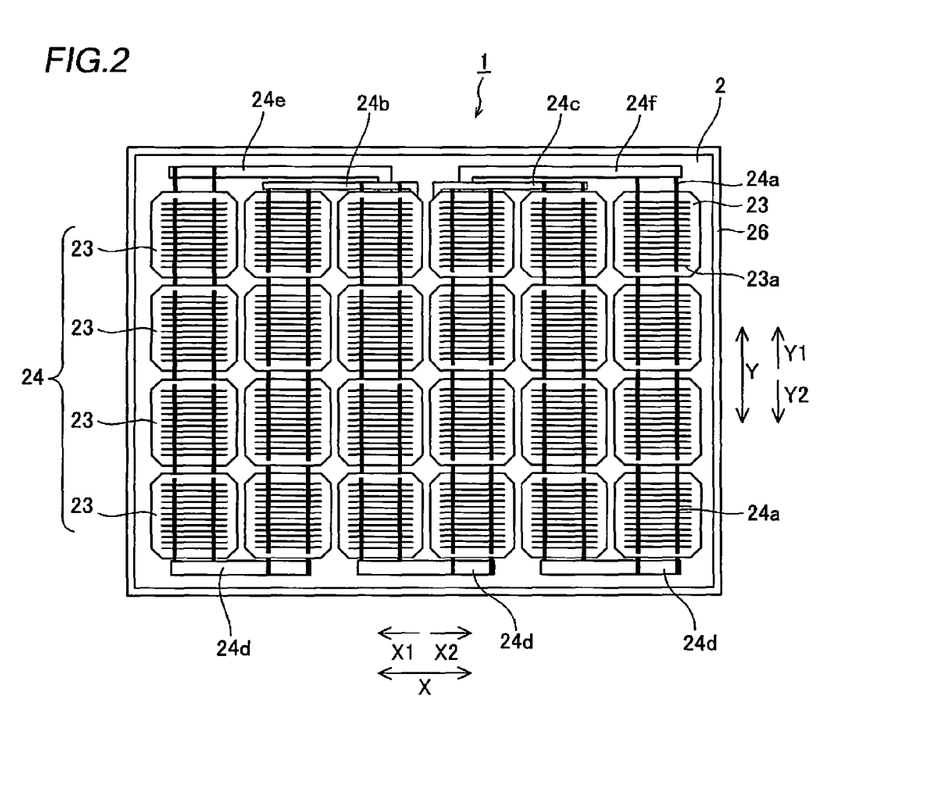
FIG. 2 A top plan view showing the solar cell module according to the first embodiment shown in FIG. 1.
Figure 3:
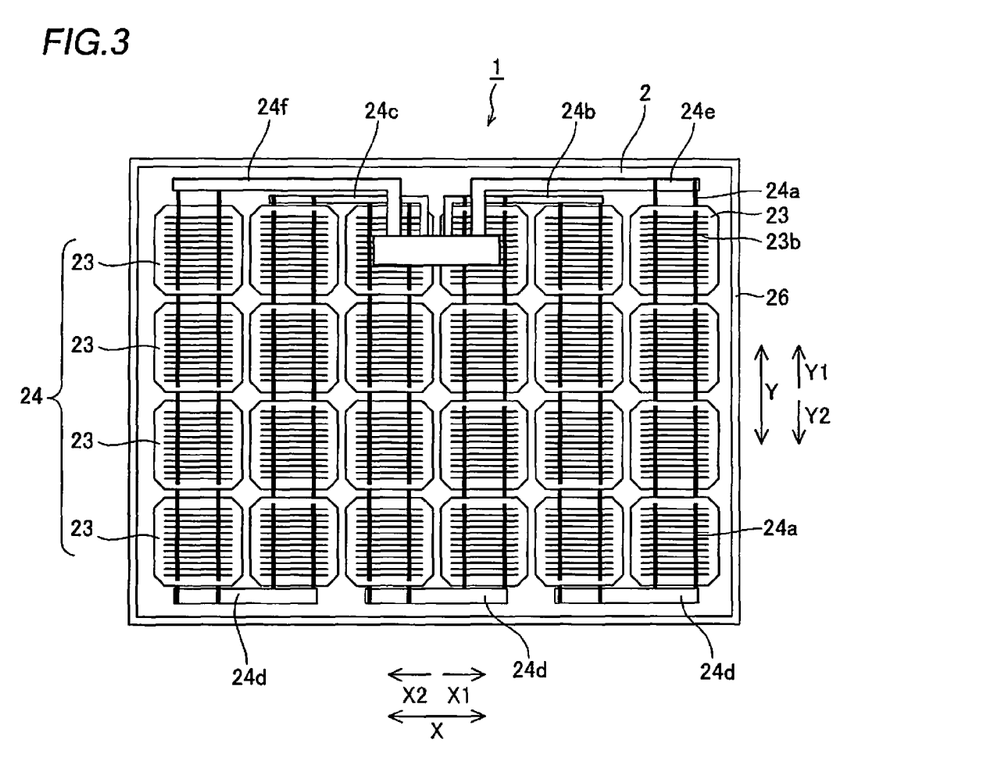
FIG. 3 A bottom plan view showing the solar cell module according to the first embodiment shown in FIG. 1.

As shown in FIG. 2, a plurality of finger electrodes 23a extending in a direction X are provided on the surface of each solar cell 23. As shown in FIG. 3, a plurality of finger electrodes 23b are provided on the back surface of each solar cell 23. The finger electrodes 23a of first solar cells 23 among the solar cells 23 adjacent to each other and the finger electrodes 23b of second solar cells 23 are electrically connected with each other by lead wires 24a consisting of solder-plated copper wires or the like. The plurality of (in the first embodiment, four) solar cells 23 are connected in series with each other in a direction Y by the lead wires 24a, whereby each solar cell group 24 is constituted.

As shown in FIGS. 2 and 3, a plurality of (in the first embodiment, six) solar cell groups 24 are provided. The plurality of solar cell groups 24 are arranged in parallel with each other in the direction X. Assuming that the column on an end portion in a direction of arrow X1 in FIG. 2 is the first column, the solar cells 23 arranged on end portions of the solar cell groups 24 of the second column and the third column on the side of a direction of arrow Y1 are electrically connected with each other by the lead wire 24a and an L-shaped connecting member 24b. The solar cells 23 arranged on end portions of the solar cell groups 24 of the fourth column and the fifth column on the side of the direction of arrow Y1 are electrically connected with each other by the lead wire 24a and an L-shaped connecting member 24c. The solar cells 23 arranged on end portions of the solar cell groups 24 of the first column and the second column on the side of a direction of arrow Y2, the solar cells 23 arranged on end portions of the solar cell groups 24 of the third column and the fourth column on the side of the direction of arrow Y2 and the solar cells 23 arranged on end portions of the solar cell groups 24 of the fifth column and the sixth column on the side of the direction of arrow Y2 are electrically connected with each other by the lead wires 24a and connecting members 24d respectively. Thus, the plurality of solar cell groups 24 are electrically connected in series with each other through the connecting members 24b, 24c and 24d. L-shaped connecting members 24e and 24f are connected to the solar cells 23 (solar cells 23 positioned on end portions of the solar cell groups 24 of the first column and the sixth column in the direction of arrow Y1) positioned on terminal ends among these solar cell groups 24 electrically connected in series with each other respectively. The connecting members 24b, 24c, 24d, 24e and 24f and the finger electrodes 23a or 23b of the solar cells 23 positioned on the end portions of the solar cell groups 24 in the direction Y are electrically connected with each other by the lead wires 24a respectively.

As shown in FIG. 4, the L-shaped connecting member 24b, the connecting member 24c, the connecting member 24e and the connecting member 24f are derived outward from the solar cell panel 2 through a notch 22a of the back-side cover 22 respectively. Forward end portions of the respective ones of these connecting members 24b, 24c, 24e and 24f are electrically connected with terminal blocks 33, 34, 35 and 36, described later, in the terminal box 3.

Figure 5:
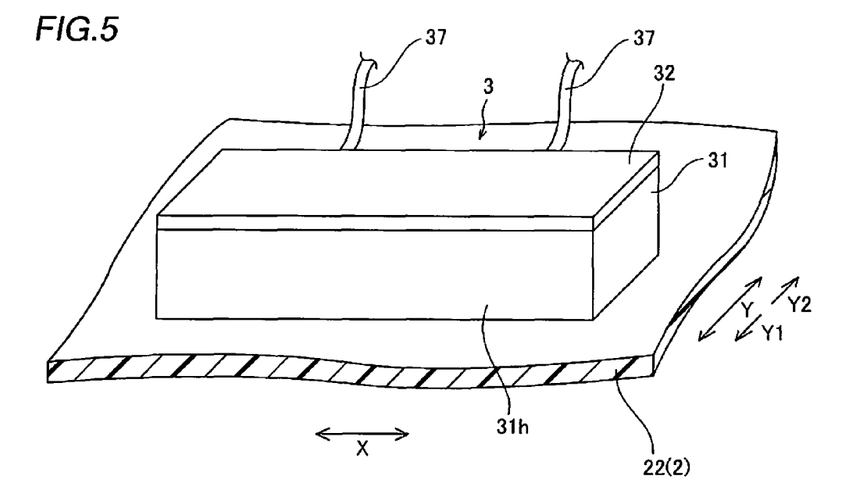
FIG. 5 A perspective view of a terminal box of the solar cell module according to the first embodiment shown in FIG. 1 as viewed from the side of the lower surface.
Figure 6:
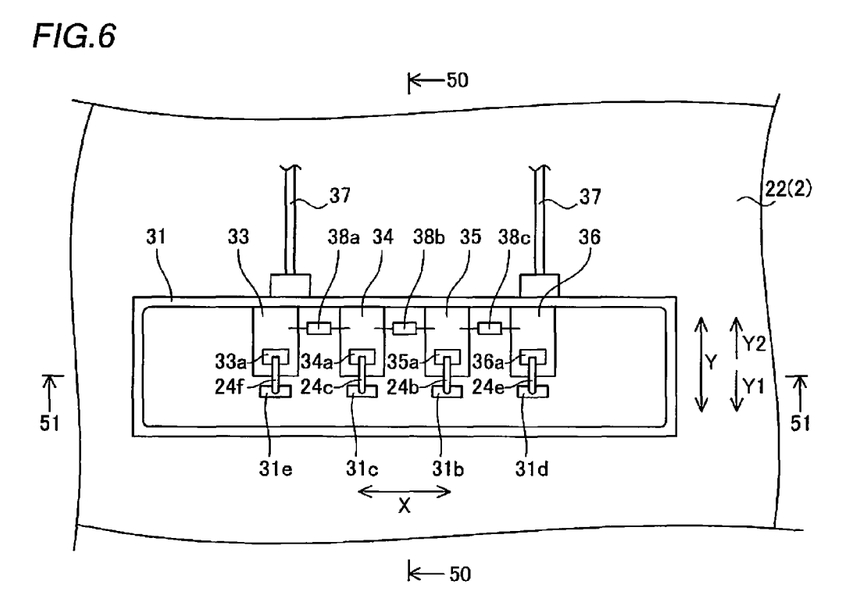
FIG. 6 A plan view showing a state of removing a lid member of the terminal box of the solar cell module according to the first embodiment shown in FIG. 1.

As shown in FIGS. 5 and 6, the terminal box 3 includes a box-shaped body portion 31 made of resin, a lid member 32 made of resin, the four terminal blocks 33, 34, 35 and 36 (see FIG. 6) set in the body portion 31 and connected with the connecting members 24b, 24c, 24e and 24f respectively, and external connecting cables 37. The body portion 31 and the lid member 32 are rectangularly formed in plan view. The respective ones of the terminal blocks 33, 34, 35 and 36 have terminals 33a, 34a, 35a and 36a. The terminals 33a, 34a, 35a and 36a are connected to the external connecting cables 37 through the terminal blocks 33, 34, 35 and 36. The terminal blocks (the terminal block 33 and the terminal block 34, the terminal block 34 and the terminal block 35, and the terminal block 35 and the terminal block 36) adjacent to each other are connected with each other through bypass diodes 38a, 38b and 38c respectively.

Figure 7:
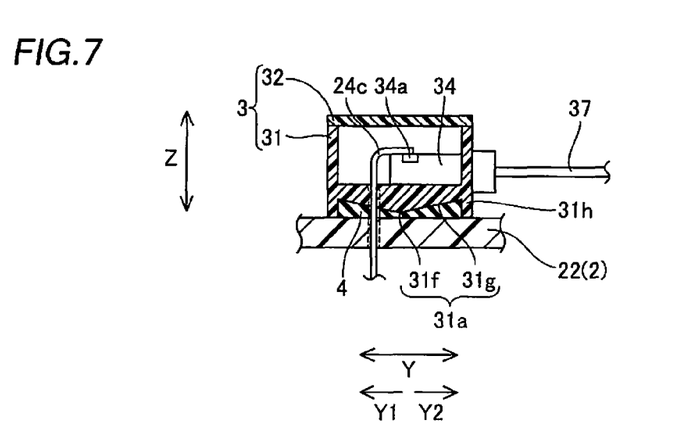
FIG. 7 A sectional view taken along the line 50-50 in FIG. 6.
Figure 8:
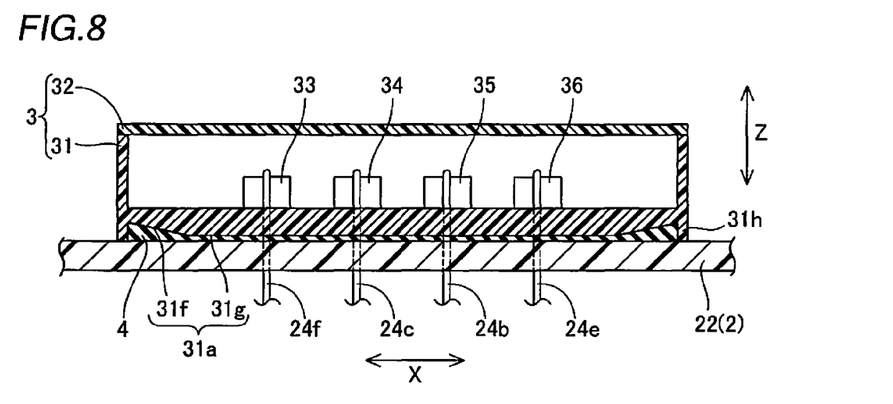
FIG. 8 A sectional view taken along the line 51-51 in FIG. 6.
Figure 9:
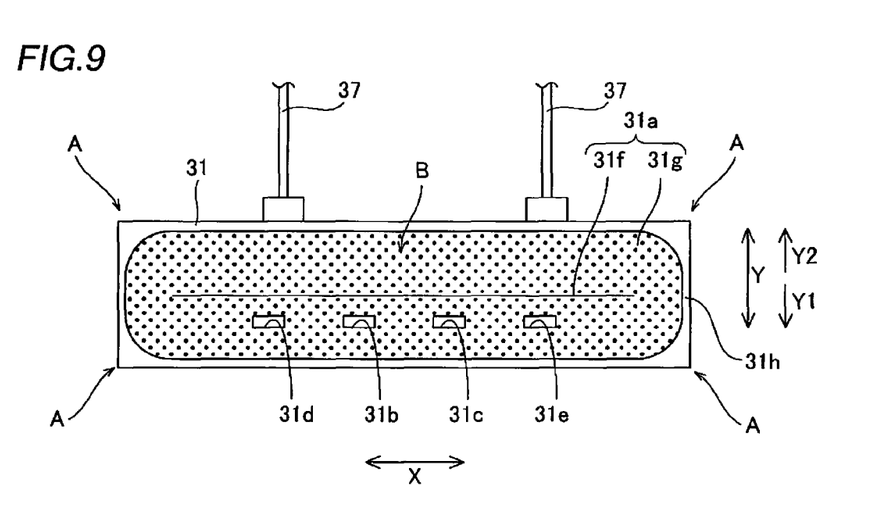
FIG. 9 A plan view showing an adhesive surface of the terminal box of the solar cell module according to the first embodiment shown in FIG. 1.

As shown in FIGS. 7 to 9, an adhesive surface 31a adhered to the surface of the solar cell panel 2 is provided on the lower surface of the body portion 31. As shown in FIGS. 6 and 9, four openings 31b, 31c, 31d and 31e conducting the outer portion (side of the solar cell panel 2) and the inner portion (side of the terminal blocks 33 to 36) of the body portion 31 are formed on the lower surface (adhesive surface 31a) of the body portion 31. As shown in FIG. 6, the connecting members 24b, 24c, 24e and 24f are introduced from the outer portion into the inner portion of the body portion 31 through the openings 31b to 31e respectively.

According to the first embodiment, the adhesive surface 31a of the terminal box 3 is formed to have such a hill shape that a central portion in a planarly observed case is relatively convex with respect to peripheral edge portions, as shown in FIGS. 7 to 9. More specifically, the adhesive surface 31a has a top portion 31f where the distance from the surface of the solar cell panel 2 in a direction Z is the smallest and an inclined portion 31g so formed that the distance from the solar cell panel 2 in the direction Z enlarges as separating from the top portion 31f. The top portion 31f is formed to linearly extend along the longitudinal direction (direction X) of the terminal box 3 on the central portion of the adhesive surface 31a in the direction Y. The inclined portion 31g consists of an inclined surface having a prescribed angle (at least 10 degrees and not more than 20 degrees, for example) of inclination. The inclination of the inclined portion 31g is formed to radially spread from the top portion 31f toward the peripheral edge portions of the adhesive surface 31a. When described in more detail, the inclined portion 31g is inclined in the direction Y and has a constant angle of inclination in a region held between two sides of the peripheral edge portions of the adhesive surface 31a opposed to each other and the top portion 31f. In a region held by two sides of the peripheral edge portions of the adhesive surface 31a opposed to each other in the direction X and the top portion 31f, the inclined portion 31g is inclined in the direction X. In a region between a portion of the inclined portion 31g inclined in the direction Y and a portion inclined in the direction X, the direction of inclination and the angle of inclination continuously change from the direction X to the direction Y.

A wall surface portion 31h protruding in the direction Z on the side of the solar cell panel 2 is circumferentially formed on the peripheral edge portions of the adhesive surface 31a. The height of protrusion of the wall surface portion 31h in the direction Z is larger than the height of protrusion of the top portion 31f. In a region A where corner portions of the lower surface (adhesive surface 31a) of the terminal box 3 are positioned in plan view, an inner side surface of the wall surface portion 31h has an arcuate shape.

The adhesive 4 consists of silicone resin or epoxy resin, and adheres the terminal box 3 and the solar cell panel 2 to each other in a state filled into a space formed by the surface of the solar cell panel 2 and the adhesive surface 31a and the wall surface portion 31h of the terminal box 3. As shown in FIG. 9, a region B (illustrated in a halftone manner) adhered by the adhesive 4 is defined by the inner side surface of the wall surface portion 31h in plan view.

A method for manufacturing the solar cell module 1 according to the first embodiment of the present invention is now described with reference to FIGS. 10 to 12.

First, the solar cell panel 2 constituted of the surface-side cover 21, the back-side cover 22, the solar cell groups 24 consisting of the solar cells 23, the bonding material 25 and the metal frame body 26 is prepared. The connecting members 24b, 24c, 24e and 24f are derived from the back-side cover 22 of this solar cell panel 2. The surface of this back-side cover 22 and the adhesive surface 31a of the body portion 31 of the terminal box 3 are arranged to be opposed to each other. Then, the respective ones of the four connecting members 24b, 24c, 24e and 24f are inserted into the openings 31b to 31e formed in the adhesive surface 31a of the body portion 31.

Figure 10:
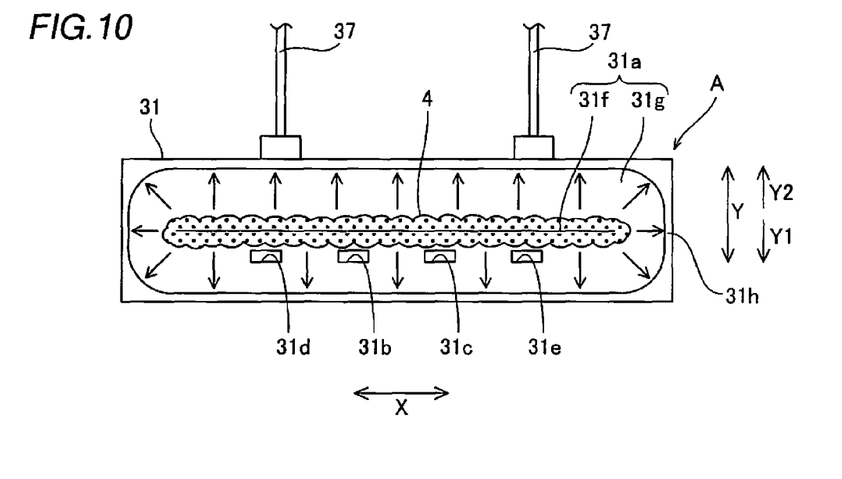
FIG. 10 A plan view for illustrating a step of adhering the terminal box and the solar cell panel to each other in a manufacturing process for the solar cell module according to the first embodiment of the present invention.
Figure 11:
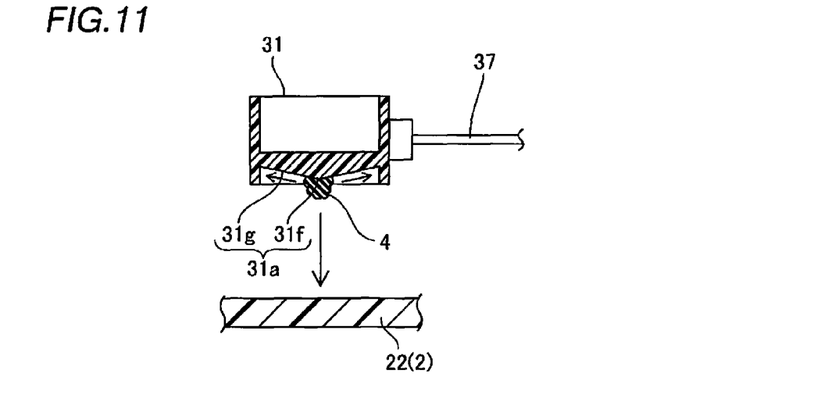
FIG. 11 A sectional view for illustrating the step of adhering the terminal box and the solar cell panel to each other in the manufacturing process for the solar cell module according to the first embodiment of the present invention.
Figure 12:
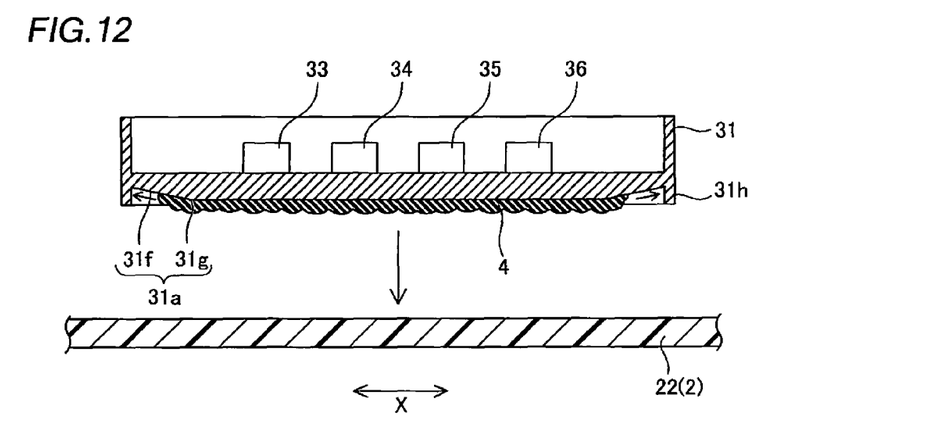
FIG. 12 A sectional view for illustrating the step of adhering the terminal box and the solar cell panel to each other in the manufacturing process for the solar cell module according to the first embodiment of the present invention.

Thereafter the adhesive 4 is applied to the top portion 31f of the adhesive surface 31a and a region in the vicinity of the top portion 31f, as shown in FIGS. 10 to 12. Then, the adhesive surface 31a is pressed against the surface of the back-side cover 22 (surface of the solar cell panel 2). At this time, the adhesive 4 on the top portion 31f spreads on the whole of the adhesive surface 31a along the inclination of the inclined portion 31g as shown by arrows in FIGS. 10 to 12 due to pressure by the back-side cover 22. When the wall surface portion 31h comes into contact with the surface of the back-side cover 22, the space surrounded by the back-side cover 22, the adhesive surface 31a and the wall surface portion 31h is formed, and enters a state where the adhesive 4 is filled into the space.

Thereafter the respective ones of the terminals 33a to 36a of the terminal blocks 33 to 36 of the terminal box 3 and forward end portions of the connecting members 24b, 24c, 24e and 24f introduced into the terminal box 3 are electrically connected with each other by soldering. After the lid member 32 is mounted on the body portion 31, the adhesive 4 is hardened by leaving the same for a prescribed period. Thus, the terminal box 3 and the solar cell panel 2 are fixed to each other, and the solar cell module 1 is completed.

According to the first embodiment, as hereinabove described, the adhesive surface 31a of the terminal box 3 to which the solar cell panel 2 is adhered is provided with the top portion 31f where the distance from the surface of the solar cell panel 2 is the smallest and the inclined portion 31g so formed that the distance from the surface of the solar cell panel 2 enlarges as separating from the top portion 31f. The solar cell module 1 is so formed in this manner that the adhesive 4 on the top portion 31f can be induced to spread over the whole of the adhesive surface 31a along the inclination of the inclined portion 31g by pressing the adhesive surface 31a of the terminal box 3 against the surface of the solar cell panel 2 in the state applying the adhesive 4 to the top portion 31f when adhering the solar cell panel 2 and the terminal box 3 to each other. Thus, formation of a region (uneven application) where the adhesive 4 does not spread can be suppressed also in a case where the adhesive surface 31a of the terminal box 3 is not parallel to the surface of the solar cell panel 2 when pressing the solar cell panel 2 and the terminal box 3 against each other. Thus, the surface of the solar cell panel 2 and the adhesive surface 31a of the terminal box 3 can be reliably adhered to each other on the whole of the adhesive surface 31a, whereby reduction in adhesive strength between the solar cell panel 2 and the terminal box 3 can be suppressed. Further, the adhesive 4 can be spread over the whole of the adhesive surface 31a also when reducing the quantity of the adhesive 4 due to the top portion 31f and the inclined portion 31g, whereby the quantity of the adhesive 4 can be reduced. Thus, a quantity (quantity of an excess adhesive 4) projecting from the periphery of the adhesive surface 31a of the terminal box 3 when pressing the solar cell panel 2 and the terminal box 3 against each other can be reduced. Thus, reduction in the adhesive strength between the solar cell panel 2 and the terminal box 3 can be suppressed while reducing the quantity of use of the adhesive 4.

According to the first embodiment, as hereinabove described, the wall surface portion 31h protruding toward the side of the solar cell panel 2 is circumferentially formed on the peripheral edge portions of the adhesive surface 31a. When the solar cell module 1 is formed in this manner, projection of the adhesive 4 from the periphery of the adhesive surface 31a of the terminal box 3 can be blocked by the wall surface portion 31h circumferentially provided on the peripheral edge portions of the adhesive surface 31a when pressing the solar cell panel 2 and the terminal box 3 against each other. Thus, also when the adhesive 4 is going to project from an end portion of the adhesive surface 31a before the adhesive 4 spreads over the whole of the adhesive surface 31a, the projection can be suppressed. Thus, the applied adhesive 4 can be reliably held in the region of the adhesive surface 31a of the terminal box 3, whereby the whole of the applied adhesive 4 can be made to contribute to the adhesive. Further, the adhesive 4 is inhibited from projecting from the end portion of the adhesive surface 31a, whereby a removing operation for a projecting adhesive 4 can be omitted. Thus, manufacturing steps for the solar cell module 1 can be simplified.

Further, the wall surface portion 31h is so provided that the adhesive 4 is inhibited from projecting from the end portion of the adhesive surface 31a, whereby a fine appearance of the solar cell module 1 can be inhibited from being damaged due to projection of the adhesive 4.

According to the first embodiment, as hereinabove described, the inner side surface of the wall surface portion 31h is formed to be arcuate in the region where the corner portions of the adhesive surface 31a are positioned in plan view. When the solar cell module 1 is formed in this manner, the adhesive 4 can be easily spread over the whole surface of the adhesive surface 31a dissimilarly to a case where the adhesive 4 does not spread up to nooks due to the inner side surface of the wall surface portion 31h angular in the region where the corner portions of the adhesive surface 31a are positioned.

According to the first embodiment, as hereinabove described, the height of projection of the wall surface portion 31h in the direction Z is so rendered larger than the height of protrusion of the top portion 31f that the wall surface portion 31h can be brought into contact with the solar cell panel 2 dissimilarly to a case where the height of protrusion of the wall surface portion 31h in the direction Z is smaller than the height of protrusion of the top portion 31f, whereby the adhesive 4 can be reliably inhibited from projecting outward from the terminal box 3.

According to the first embodiment, as hereinabove described, the top portion 31f is arranged on the central portion of the adhesive surface 31a and the inclined portion 31g is formed to radially spread from the top portion 31f toward the wall surface portion 31h, whereby the adhesive 4 applied to the central portion can be easily spread over the whole of the adhesive surface 31a along the radial inclined portion 31g.

Second Embodiment

A solar cell module 101 according to a second embodiment of the present invention is now described with reference to FIGS. 13 and 14. In this second embodiment, an example of forming notch portions 131b on a wall surface portion 131a of a terminal box 103 is described, dissimilarly to the aforementioned first embodiment.

Figure 13:
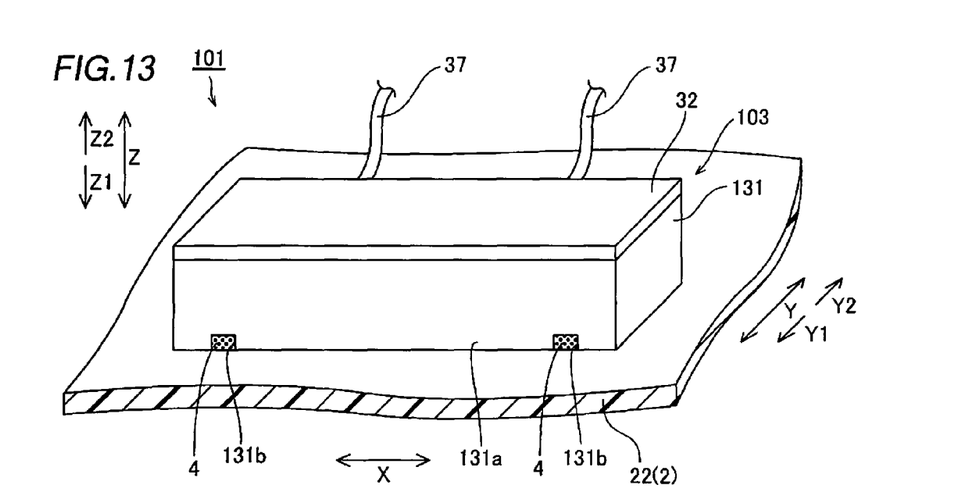
FIG. 13 A perspective view of a terminal box of a solar cell module according to a second embodiment of the present invention as viewed from the side of the lower surface.

As shown in FIG. 13, the solar cell module 101 according to the second embodiment includes a solar cell panel 2 and the terminal box 103. The terminal box 103 includes a box-shaped body portion 131 and a lid member 32. An adhesive surface 31a adhered to the surface of the solar cell panel 2 is provided on the lower surface of the body portion 131. The wall surface portion 131a protruding to the side of the solar cell panel 2 is circumferentially formed on peripheral edge portions of the adhesive surface 31a. The structure of the body portion 131 is similar to that of the body portion 31 in the aforementioned first embodiment, except a point that the notch portions 131b described later are provided on the wall surface portion 131a.

Figure 14:
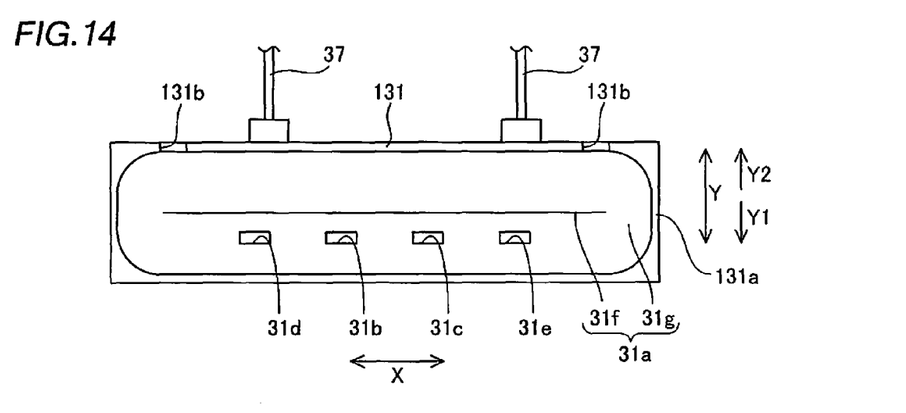
FIG. 14 A plan view showing an adhesive surface of the terminal box of the solar cell module according to the second embodiment of the present invention shown in FIG. 13.

According to the second embodiment, the notch portions 131b are formed on two portions on an end portion of the wall surface portion 131a in a direction of arrow Z1, as shown in FIG. 14. The notch portions 131b are formed one by one on both ends in a direction X on a side opposite to openings 31b to 31e with respect to a top portion 31f of the wall surface portion 131a. As shown in FIG. 13, adhesives 4 (illustrated in a halftone manner) are filled into the notch portions 131b, while an outer side surface of the body portion 131 on the side provided with the notch portions 131b and outer side surfaces of the adhesives 4 in the notch portions 131b are substantially flush with each other. In other words, the adhesives 4 in the notch portions 131b do not project from the outer side surfaces of the notch portions 131b in a state of a finished product after assembling. The notch portions 131b are examples of the "vent portion" in the present invention.

Figure 15:
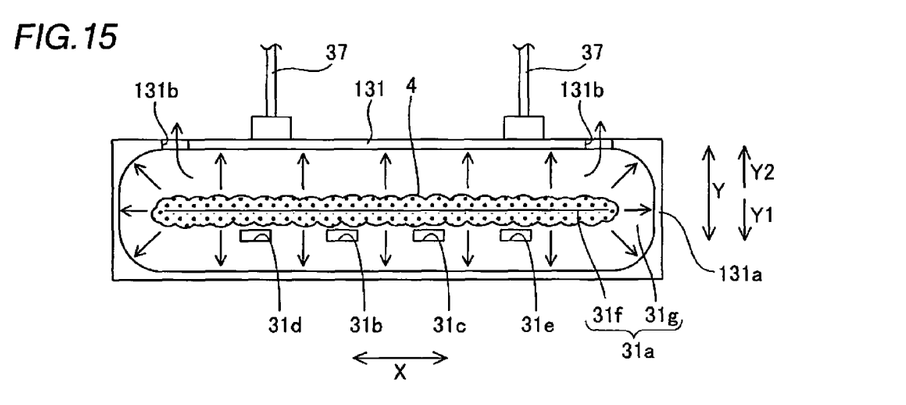
FIG. 15 A plan view for illustrating a step of adhering the terminal box and the solar cell panel to each other in a manufacturing process for the solar cell module according to the second embodiment of the present invention.

A method for manufacturing the solar cell module 101 according to the second embodiment is now described with reference to FIG. 15. In the second embodiment, steps other than a step of adhering the terminal box 103 and the solar cell panel 2 to each other are similar to those of the aforementioned first embodiment, and hence redundant description is omitted.

First, the adhesive surface 31a is pressed against a back-side cover 22 (solar cell panel 2) in a state applying an adhesive 4 to the top portion 31f of the adhesive surface 31a, similarly to the aforementioned first embodiment. At this time, the adhesive 4 on the top portion 31f spreads over the whole of the adhesive surface 31a along inclination of an inclined portion 31g as shown by arrows in FIG. 15 due to pressure by the back-side cover 22. When the wall surface portion 131a comes into contact with the surface of the back-side cover 22, a space surrounded by the back-side cover 22, the adhesive surface 31a and the wall surface portion 131a is formed, and enters a state where the adhesive 4 is filled into the space. According to the second embodiment, excess quantities of adhesives 4 project to the outer side of the wall surface portion 131a (outer side of the terminal box 103) through the two notch portions 131b if the quantity of the adhesive 4 applied to the adhesive surface 31a is excessive. An operator removes the adhesives 4 projecting in the vicinity of the notch portions 131b. When the adhesive 4 is hardened, adhering between the terminal box 103 and the solar cell panel 2 is completed.

According to the second embodiment, as hereinabove described, the notch portions 131b are so provided on prescribed positions of the wall surface portion 131a that the adhesive 4 can be reliably filled into the space formed by the surface of the solar cell panel 2 and the adhesive surface 31a and the wall surface portion 131a of the terminal box 103 and the excess adhesives 4 can be projected from the notch portions 131b when the adhesive surface 31a of the terminal box 103 is pressed against the surface of the solar cell panel 2, by performing the adhering while rendering the quantity of application of the adhesive 4 to the adhesive surface 31a somewhat large. Thus, the solar cell panel 2 and the terminal box 103 can be reliably adhered to each other with the adhesive 4 filled into the space formed by the surface of the solar cell panel 2 and the adhesive surface 31a and the wall surface portion 131a of the terminal box 103. The excess adhesives 4 project from only the notch portions 131b, whereby a removing operation for the projecting adhesives 4 can be easily performed, and the removing operation for the projecting adhesives 4 can be simplified.

The remaining effects of the second embodiment are similar to those of the aforementioned first embodiment.

Third Embodiment

A solar cell module 201 according to a third embodiment of the present invention is now described with reference to FIGS. 16 and 17. In this third embodiment, an example of circumferentially arranging a top portion 231b along peripheral edges of openings 31b to 31e is described, dissimilarly to the aforementioned second embodiment.

Figure 16:
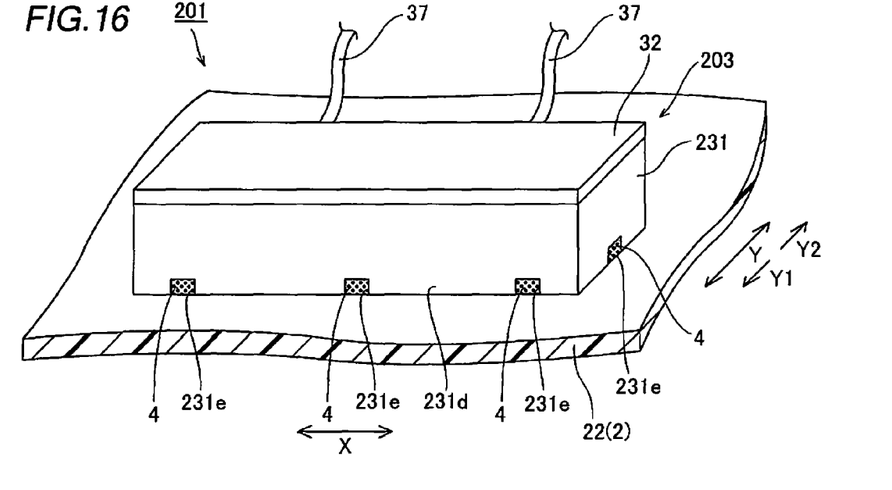
FIG. 16 A perspective view of a terminal box of a solar cell module according to a third embodiment of the present invention as viewed from the side of the lower surface.
Figure 17:
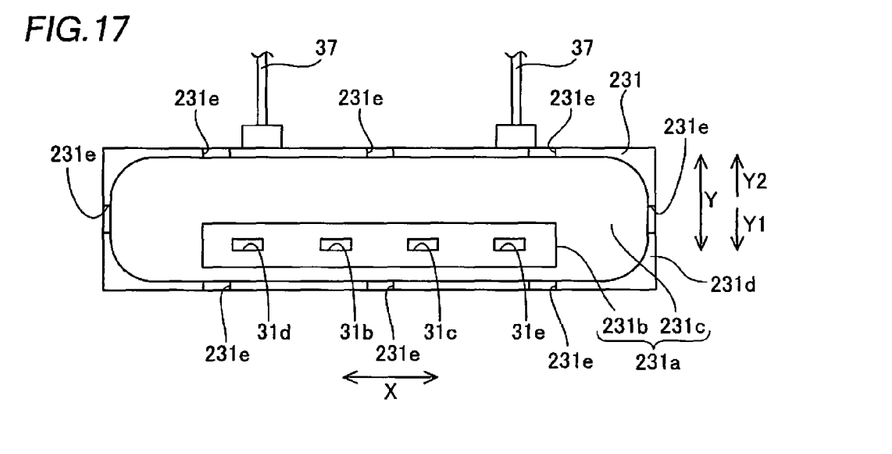
FIG. 17 A plan view showing an adhesive surface of the terminal box of the solar cell module according to the third embodiment of the present invention.

As shown in FIG. 16, the solar cell module 201 according to the third embodiment includes a solar cell panel 2 and a terminal box 203. The terminal box 203 includes a box-shaped body portion 231 and a lid member 32. As shown in FIG. 17, an adhesive surface 231a adhered to the surface of the solar cell panel 2 is provided on the lower surface of the body portion 231. According to the third embodiment, the top portion 231b is provided in the form of a rectangular plane on a region including the four openings 31b to 31e. Further, the top portion 231b is formed to extend along the longitudinal direction of the terminal box 203. The top portion 231b is formed on a position biased from a central portion in a direction of arrow Y1. Inclination of an inclined portion 231c is formed to radially spread outward from the top portion 231b toward peripheral edge portions (wall surface portion 231d) of the adhesive surface 231a. According to the third embodiment, notch portions 231e are formed on eight portions of the wall surface portion 231d. More specifically, the notch portions 231e are formed three by three on a pair of sides of the wall surface portion 231d extending in a direction X respectively and one by one on a pair of sides of the wall surface portion 231d extending in a direction Y respectively. Similarly to the aforementioned second embodiment, adhesives 4 are filled into the notch portions 231e, while side surfaces of the body portion 231 and side surfaces of the adhesives 4 in the notch portions 231e are substantially flush with each other. The notch portions 231e are examples of the "vent portion" in the present invention.

Figure 18:
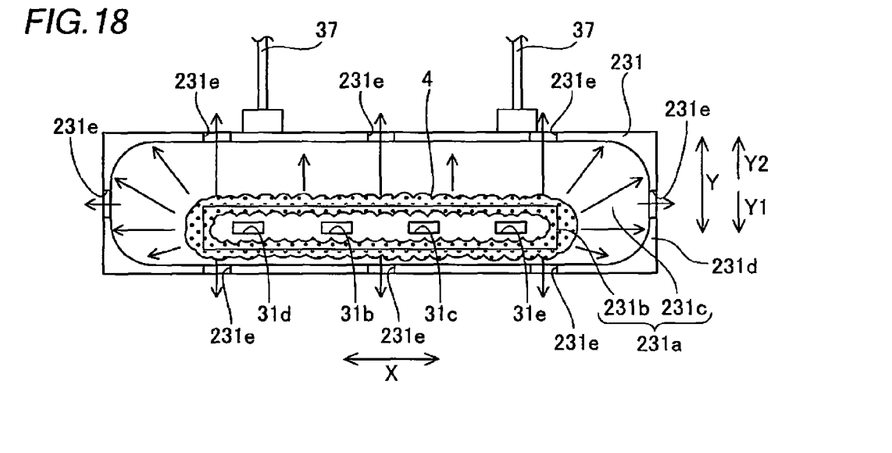
FIG. 18 A plan view for illustrating a step of adhering the terminal box and the solar cell panel to each other in a manufacturing process for the solar cell module according to the third embodiment of the present invention.

A method for manufacturing the solar cell module 201 according to the third embodiment is now described with reference to FIG. 18. In the third embodiment, steps other than a step of adhering the terminal box 203 and the solar cell panel 2 to each other are similar to those of the aforementioned first embodiment, and hence redundant description is omitted.

First, the adhesive surface 231a is pressed against a back-side cover 22 (solar cell panel 2) in a state circumferentially applying an adhesive 4 to the planar top portion 231b of the adhesive surface 231a and a region in the vicinity thereof to surround the openings 31b to 31e. At this time, the adhesive 4 on the top portion 231b spreads over the whole of the adhesive surface 231a along the inclination of the inclined portion 231c as shown by arrows in FIG. 18 due to pressure by the back-side cover 22. According to the third embodiment, the adhesive 4 spreads outward from the top portion 231b, whereby the adhesive 4 is inhibited from entering the openings 31b to 31e. The adhesive 4 slightly spreads also inward from the top portion 231b. When the wall surface portion 231d comes into contact with the surface of the back-side cover 22, a space surrounded by the back-side cover 22, the adhesive surface 231a and the wall surface portion 231d is formed, and enters a state where the adhesive 4 is filled into the space. According to the third embodiment, excess quantities of adhesives 4 project to the outer side of the wall surface portion 231d (outer side of the terminal box 203) through the eight notch portions 231e formed on four sides of the wall surface portion 231d if the quantity of the adhesive 4 applied to the adhesive surface 231a is excessive. An operator removes the adhesives 4 projecting in the vicinity of the notch portions 231e. When the adhesive 4 is hardened, adhering between the terminal box 203 and the solar cell panel 2 is completed.

According to the third embodiment, as hereinabove described, the top portion 231b is planarly formed on the region including the openings 31b to 31e, and the inclined portion 231c is formed to spread from the planar top portion 231b toward the wall surface portion 231d. The solar cell module 201 is so formed in this manner that the adhesive 4 applied to the top portion 231b is induced by the inclined portion 231c to spread from the peripheral edges of the openings 31b to 31e, whereby the adhesive 4 can be inhibited from entering the openings 31b to 31e. Thus, the quantity of use of the adhesive 4 can be reduced.

The remaining effects of the third embodiment are similar to those of the aforementioned first embodiment.

The embodiments disclosed this time must be considered illustrative in all points and not restrictive. The range of the present invention is shown not by the above description of the embodiments but by the scope of claims for patent, and all modifications within the meaning and range equivalent to the scope of claims for patent are further included.

For example, while the example of constituting the inclined portion of a planar surface has been shown in each of the aforementioned first to third embodiments, the present invention is not restricted to this, but the inclined portion may be so formed that the height of protrusion reduces stepwise from the top portion toward the peripheral edge portions of the adhesive surface. A groove may be formed to extend along the direction of inclination, or fine irregularities may be formed on the inclined surface.

While the example of constituting the inclined portion of the planar surface having the prescribed angle of inclination has been shown in each of the aforementioned first to third embodiments, the present invention is not restricted to this, but the inclined portion may be constituted of a curved surface.

While the example of forming the top portion to linearly extend in plan view has been shown in each of the aforementioned first to third embodiments, the present invention is not restricted to this, but the top portion may be formed by a plane having a prescribed area.

While the example of arranging the top portion on the central portion of the adhesive surface and arranging the inclined portion to radially spread from the top portion in four directions has been shown in each of the aforementioned first to third embodiments, the present invention is not restricted to this, but the position, the number, the shape etc. of the top portion may be properly selected. For example, the top portion may be arranged on one end portion of the adhesive surface, while the inclined portion may be arranged to extend from one end portion to another end portion of the adhesive surface. Further, the angle of inclination of the inclined portion may not be constant, but the angle of inclination may vary with a place.

Figure 19:
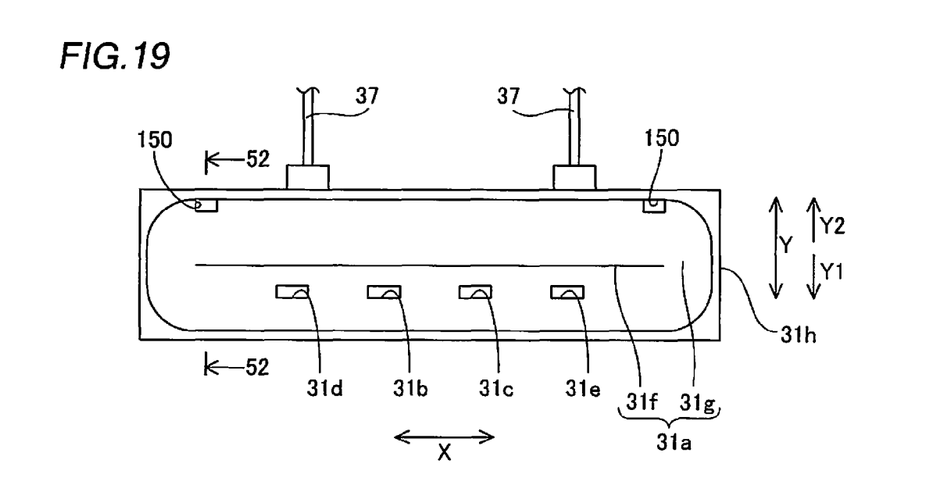
FIG. 19 A plan view showing an adhesive surface of a terminal box of a solar cell module according to a first modification of the second embodiment of the present invention.
Figure 20:
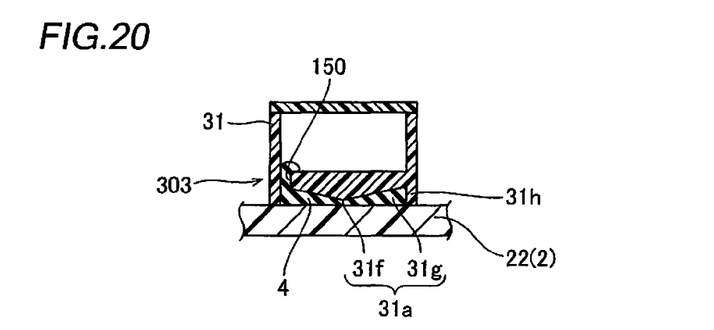
FIG. 20 A sectional view taken along the line 52-52 in FIG. 19.

While the example of projecting the excess adhesives 4 by forming the notch portions 131e on the wall surface portion 131d has been shown in the aforementioned second embodiment, the present invention is not restricted to this, but holes may be formed on the wall surface portion. These holes provided on the wall surface portion are examples of the "vent portion" in the present invention. Further, holes 105 conducting an adhesive surface 31a and the inner portion of a terminal box 303 may be so formed as to project excess adhesives 4 into a terminal box 303 through the holes 105, as in a first modification of the second embodiment shown in FIGS. 19 and 20. The holes 105 are formed on an end portion (peripheral edge portion) of the adhesive surface 31*a*, and provided separately from openings 31*b* to 31*e* (see FIG. 6). The holes 150 are examples of the "vent portion" in the present invention.

Figure 21:
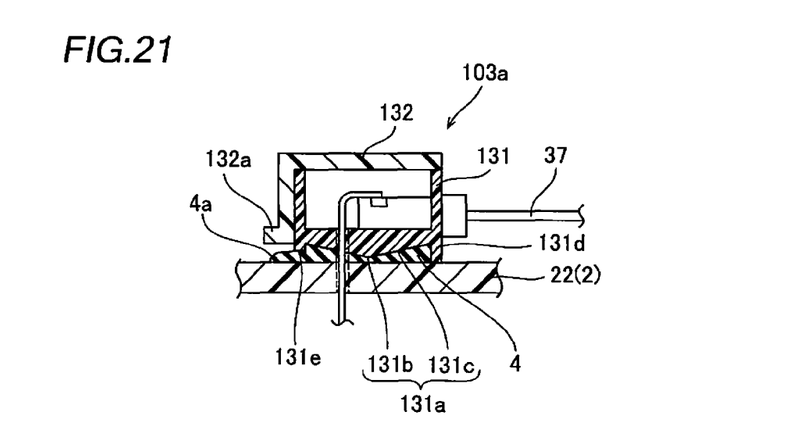
FIG. 21 A sectional view showing an adhered state between a terminal box and a solar cell panel of a solar cell module according to a second modification of the second embodiment of the present invention.

While the example in which the operator removes the adhesives 4 projecting from the notch portions 131*e* has been shown in the aforementioned second embodiment, the present invention is not restricted to this, but the adhesives 4 may not be removed. In this case, a lid member 132 having a roof portion 132*a* provided on a position corresponding to a notch portion 131*e* may be employed, as in a second modification of the second embodiment shown in FIG. 21. In this case, an adhesive 4*a* projecting from a peripheral edge of a terminal box 103*a* can be concealed with the roof portion 132*a* of the 11*d* member 132, whereby the number of operations of an operator can be reduced without damaging a fine appearance of a solar cell module.

While the example of employing silicone resin as the adhesive 4 has been shown in each of the aforementioned first to third embodiments, the present invention is not restricted to this, but the adhesive may be a pasty adhesive having proper viscosity before hardening (when applied to an adhesive surface).

While the example of rendering the height of protrusion of the wall surface portion larger than the height of protrusion of the top portion has been shown in each of the aforementioned first to third embodiments, the present invention is not restricted to this, but the height of protrusion of the wall surface portion may be rendered smaller than the height of protrusion of the top portion. Also in this case, the adhesive can be inhibited from projecting from the terminal box by the wall surface portion.

The invention claimed is:

1. A solar cell module comprising:
a solar cell panel including a solar cell; and
a terminal box adhered to said solar cell panel through an adhesive, for collecting electricity generated in said solar cell panel, wherein
an adhesive surface of said terminal box adhered to said solar cell panel includes: a) a top portion where the distance from a top surface of said solar cell panel is the smallest with respect to other portions of said adhesive surface, and b) an inclined portion so formed that the distance from the top surface of said solar cell panel increases proportionally with respect to a distance of said inclined portion from said top portion, and
a wall surface portion of said terminal box disposed closest to a side surface of said solar cell panel is circumferentially formed on a peripheral edge portion of said adhesive surface, wherein a height of the wall surface portion is larger than a height of the top portion, wherein the wall surface portion directly contacts with the top surface of said solar cell panel, and wherein the top surface portion lacks direct contact with the top surface of said solar cell panel.

2. The solar cell module according to claim 1, wherein a notch-shaped or hole-shaped vent portion is formed on at least either said adhesive surface or said wall surface portion.

3. The solar cell module according to claim 2, wherein a plurality of said vent portions are provided.

4. The solar cell module according to claim 1, wherein an inner side surface of said wall surface portion has an arcuate portion in plan view on a region where a corner portion of said adhesive surface is positioned.

5. The solar cell module according to claim 1, wherein said top portion is arranged on a central portion of said adhesive surface, and
said inclined portion is formed to radially spread from said top portion toward said wall surface portion.

6. The solar cell module according to claim 5, wherein said terminal box is rectangularly formed in plan view, and said top portion is formed to extend along one side of said terminal box.

7. The solar cell module according to claim 1, wherein said top portion is formed to linearly extend.

8. The solar cell module according to claim 1, wherein said terminal box includes an opening formed on said adhesive surface for introducing a connecting member connected to the solar cell of said solar cell panel into said terminal box,
said top portion is planarly formed on a region including said opening, and
said inclined portion is formed to radially spread from said planar top portion toward said wall surface portion.

9. The solar cell module according to claim 8, wherein said planar top portion is formed on a position biased from a central portion of said terminal box in plan view.

10. The solar cell module according to claim 1, wherein a distance between the adhesive surface and the solar cell panel in the height direction of the solar cell panel increases proportionally with increased distance from the top portion toward the wall surface portion.

* * * * *